(12) United States Patent
Neugeboren

(10) Patent No.: US 11,489,605 B2
(45) Date of Patent: *Nov. 1, 2022

(54) SYSTEMS AND METHODS TO IMPROVE HOLDOVER PERFORMANCE IN R-PHY NETWORK ARCHITECTURES

(71) Applicant: ARRIS Enterprises LLC, Suwanee, GA (US)

(72) Inventor: Yair Neugeboren, Netanya (IL)

(73) Assignee: ARRIS Enterprises LLC, Suwanee, GA (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/098,765

(22) Filed: Nov. 16, 2020

(65) Prior Publication Data
US 2021/0067260 A1     Mar. 4, 2021

Related U.S. Application Data

(63) Continuation of application No. 16/220,834, filed on Dec. 14, 2018, now Pat. No. 10,841,031.

(51) Int. Cl.
*H04J 3/06* (2006.01)
*H04L 12/28* (2006.01)

(52) U.S. Cl.
CPC .......... *H04J 3/0644* (2013.01); *H04J 3/0661* (2013.01); *H04J 3/0673* (2013.01); *H04L 12/2801* (2013.01)

(58) Field of Classification Search
None
See application file for complete search history.

(56) References Cited

U.S. PATENT DOCUMENTS

| | | | |
|---|---|---|---|
| 9,088,390 | B1 | 7/2015 | Wheelock |
| 9,973,601 | B2 | 5/2018 | Spada et al. |
| 2001/0038647 | A1 | 11/2001 | Bemath et al. |
| 2015/0295669 | A1 | 10/2015 | Chapman et al. |
| 2015/0326332 | A1 | 11/2015 | Chen et al. |
| 2016/0087742 | A1 | 3/2016 | Zinevich |
| 2016/0197804 | A1 | 7/2016 | Zinevich |
| 2018/0152286 | A1 | 5/2018 | Kemparaj et al. |
| 2018/0237039 | A1* | 8/2018 | Mong ................ B61L 23/005 |
| 2019/0123843 | A1* | 4/2019 | Bush .................... H04L 63/061 |
| 2019/0138047 | A1* | 5/2019 | El Kolli .............. H04J 3/0697 |
| 2019/0322299 | A1* | 10/2019 | Mong ................ H04L 65/1069 |
| 2019/0379475 | A1* | 12/2019 | Seethamraju ......... H04J 3/0632 |

OTHER PUBLICATIONS

U.S. Appl. No. 15/804,221, filed Nov. 16, 2017.
European Patent Office; International Search Report and Written Opinion dated Jul. 14, 2020 for Int'l App. No. PCT/US2019/066332 filed Dec. 13, 2019; 19 pages.
Ulrich Kohn, "Timing in Digitized Cable Networks", Jun. 23, 2017, https://blog.adva.com/en/timing-in-digitized-cable-networks, All Pages. (Year: 2017).

* cited by examiner

*Primary Examiner* — Otis L Thompson, Jr.
(74) *Attorney, Agent, or Firm* — Chernoff, Vilhauer, McClung & Stenzel, LLP

(57) ABSTRACT

Systems and methods for regaining synchronization between a CMTS core and an RPD, where both the core and the RPD are configured for individual synchronization in a slave configuration to a common grandmaster clock.

15 Claims, 4 Drawing Sheets

SYSTEMS AND METHODS TO IMPROVE HOLDOVER PERFORMANCE IN R-PHY NETWORK ARCHITECTURES

CROSS REFERENCE TO RELATED APPLICATIONS

The present application is a continuation of U.S. patent application Ser. No. 16/220,834 filed Dec. 14, 2018, the contents of which is incorporated herein by reference in its entirety.

BACKGROUND

The subject matter of this application generally relates to distributed access architectures of a hybrid CATV network, and more particularly to R-PHY (remote physical) architectures that distribute the functions of the Cable Modem Termination System into the network.

Although Cable Television (CATV) networks originally delivered content to subscribers over large distances using an exclusively RF transmission system, modern CATV transmission systems have replaced much of the RF transmission path with a more effective optical network, creating a hybrid transmission system where cable content terminates as RF signals over coaxial cables, but is transmitted over the bulk of the distance between the content provider and the subscriber using optical signals. Specifically, CATV networks include a head end at the content provider for receiving signals representing many channels of content, multiplexing them, and distributing them along a fiber-optic network to one or more nodes, each proximate a group of subscribers. The node then de-multiplexes the received optical signal and converts it to an RF signal so that it can be received by viewers. The system in a head end that provides the video channels to a subscriber typically comprises a plurality of EdgeQAM units operating on different frequency bands that are combined and multiplexed before being output onto the HFC network.

Historically, the head end also included a separate Cable Modem Termination System (CMTS), which is used to provide high speed data services, such as video, cable Internet, Voice over Internet Protocol, etc. to cable subscribers. Typically, a CMTS will include have both Ethernet interfaces (or other more traditional high-speed data interfaces) as well as RF interfaces so that traffic that is coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern HFC CATV systems have combined the functionality of the CMTS with the video delivery system (EdgeQAM) in a single platform called the Converged Cable Access Platform (CCAP).

As networks have expanded and head ends have therefore become increasingly congested with equipment, many content providers have recently used distributed architectures to spread the functionality of the CMTS/CCAP throughout the network. This distributed architecture keeps the cable data and video signals in digital format as long as possible, extending the digital signals beyond the CMTS/CCAP deep into the network before converting them to RF. It does so by replacing the analog links between the head end and the access network with a digital fiber (Ethernet/PON) connection.

One such distributed architecture is Remote PHY (R-PHY) distributed access architecture that relocates the physical layer (PHY) of a traditional CMTS or CCAP by pushing it to the network's fiber nodes. Thus, while the core in the CMTS/CCAP performs the higher layer processing, the R-PHY device in the node converts the downstream data sent by the core from digital to analog to be transmitted on radio frequency, and converts the upstream RF data sent by cable modems from analog to digital format to be transmitted optically to the core.

Once the functionality of the CMTS/CCAP is divided between a core in the head end and various PHY devices throughout the network, however, protocols must be established to properly synchronize the core with the PHY devices. Synchronization between the core and the PHY devices becomes particularly problematic when the either the core or the R-PHY device loses connection to the timing clock used for synchronization (referred to as "holdover"). Even though each device will usually include its own oscillator to mark time, the oscillators of each device will nonetheless drift relative to each other once synchronization is lost, and upon reconnection the drift may have become so severe as to impede performance.

The typical approach to redress timing issues during holdover when either the core or the R-PHY device has lost connection to the synchronization clock, is to either use better oscillators in the devices or use frequency assistance from the network to avoid frequency drift. These solutions, however, are costly in both power and price. Moreover, many networks do not even support frequency assistance. Therefore, what is desired are systems and methods to improve performance following drift during holdover in R-PHY network architectures.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

For purposes of the disclosure and the claims, the following terms are defined to as to more easily understand the subject matter described and claimed:

Master Clock: a clock that sends timing information to a slave clock for that clock to synchronize its time to that of the master clock.

Slave Clock: a clock that receives timing information from a master clock to synchronize its time to that of the master clock.

Grandmaster Clock: a clock that only operates as a master clock and is the source of time to the packet network:

Boundary Clock: a clock operates as both a slave and a master by having one port in a slave state receiving time from a master clock, and one or more ports in a master state which disseminate timing information to downstream slaves.

MAP messages: messages sent by the CMTS containing bandwidth allocation maps (MAP). The MAP contains information that indicates when a cable modem can transmit and for how long. The CMTS needs to send MAP messages ahead of time, so the cable modem will not miss the transmit opportunity.

MAP advance time: The amount of time that the CMTS sends the MAP messages ahead of the transmit opportunity of a cable modem. The CMTS can compensate for differences between its time and the Remote PHY device (RPD) time (which is also the cable modem time) by making the MAP advance time larger.

As already noted, in R-PHY systems, the clocks of the Remote PHY Devices (RPDs) and the CCAP core must be synchronized for time scheduling of data transfers to work properly, and this synchronization must not only be of frequency, but also of phase. Hence, the Remote DTI (R-DTI) specification for example, requires the RPDs and the CCAP core to be phase aligned with less than a 1 ms between the two. Two common topologies are used to provide proper synchronization.

Figure 1:
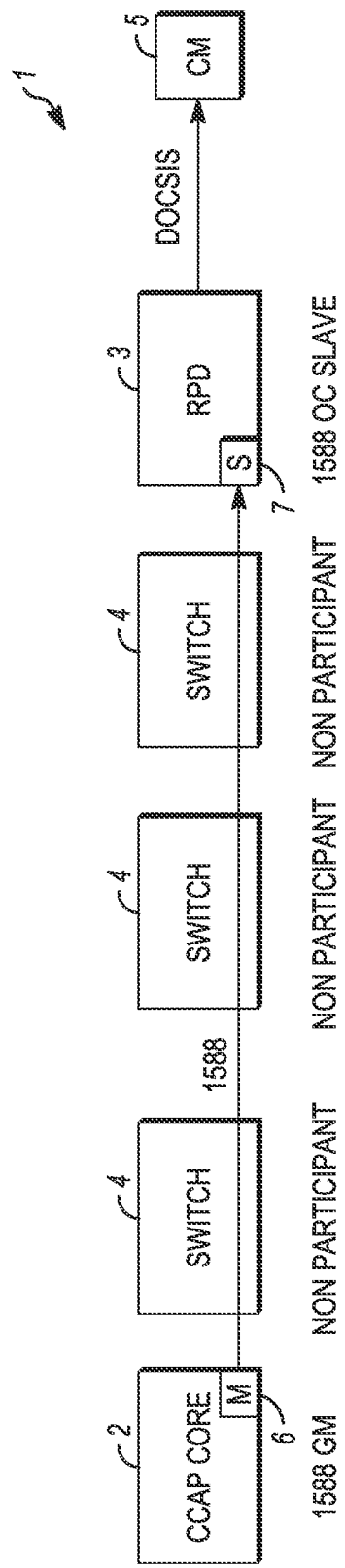
FIG. 1 shows an exemplary timing arrangement for an R-PHY system where a CCAP core is used as timing grandmaster and Remote PHY Devices (RPDs) are the timing slaves.

Referring to FIG. 1, for example, a first topology 1 may include a CCAP core 2 synchronized with an RPD 3 connected together via a plurality of network switches 4. The RPD 3 is in turn connected to one or more cable modems 5. Synchronization is attained by a grandmaster clock 6 in the core 2 which sends timing information to a slave clock 7 in the RPD 3. Those of ordinary skill in the art will appreciate that, although FIG. 1 shows only one RPD 3 connected to the core 2, many such RPDs may be simultaneously connected to the core 2, with each RPD having a slave clock 7 receiving timing information from the grandmaster clock 6 in the core.

Figure 2:
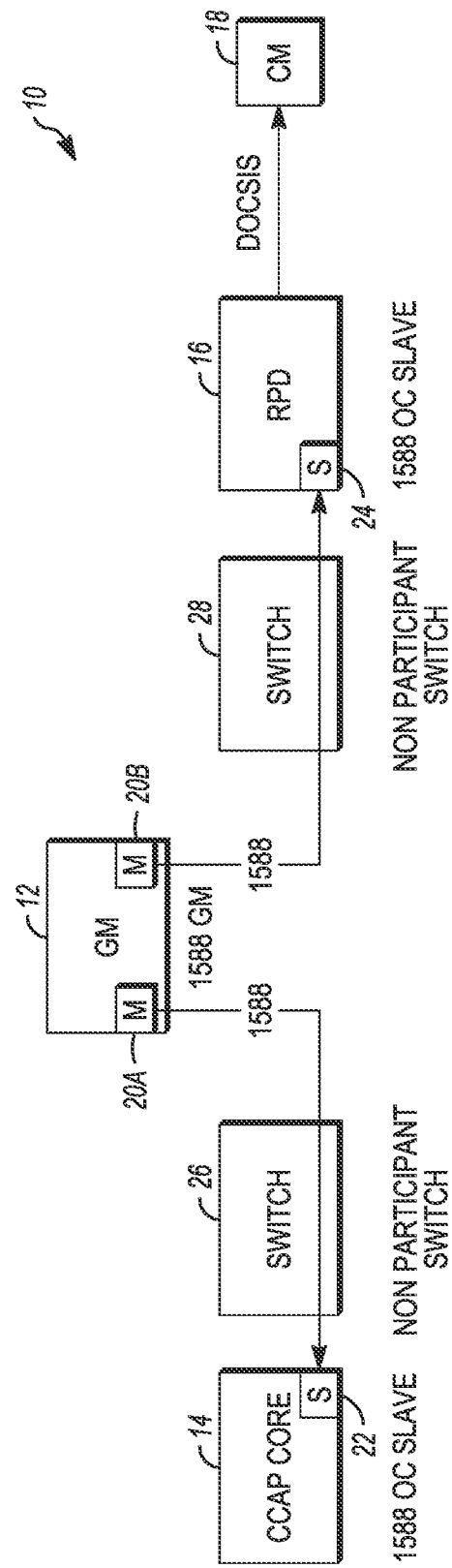
FIG. 2 shows an exemplary timing arrangement for an R-PHY system where both a CCAP core and its RPDs are timing slaves to an external grandmaster clock (GM).

FIG. 2 shows a second topology 10 to provide synchronization between a CCAP core 14 and an RPD 16, which again is connected to one or more cable modems 18. Unlike the system of FIG. 1, however, a separate timing grandmaster device 12 provides timing information to both the CCAP core 14 and the RPD 16. Specifically, the timing grandmaster 12 has a first master port 20a connected to a slave clock 22 in the CCAP core 14 and a second master port 20b connected to a slave clock 24 in the RPD 16. Those of ordinary skill in the art will recognize that the respective slave clocks of the CCAP core 14 and the RPD 16 may both be connected to a single master port in the timing grandmaster device 12, and the use of separate timing ports 20a and 20b in FIG. 2 (and throughout the specification) is used merely to more easily describe the separate timing processes. The CCAP core 14 may be connected to the timing grandmaster 12 through one or more switches 26 while the RPD 16 may be connected to the timing grandmaster 12 through one or more switches 28. Again, those of ordinary skill in the art will appreciate that, although FIG. 2 shows only one RPD 16 connected to the timing grandmaster 12, many such RPDs may be simultaneously connected to the grandmaster 12, with each RPD having a slave clock 24 receiving timing information from a port 20b in the grandmaster clock 12.

Due to common performance issues in the CCAP core, the topology 10 shown in FIG. 2 is usually more reliable than that shown in FIG. 1. However, one drawback of the topology 10 shown in FIG. 2 is that neither the core 14 nor the RPD 16 can easily identify their phase offset from each other. Thus, in order to fulfill the 1 ms tolerance permitted by the R-DTI specification, that 1 ms phase offset budget is split into two 0.5 ms offsets from the grandmaster 12 between the core 14 and the RPD 16.

While both the core 14 and the RPD 16 are locked with the timing grandmaster 12, no significant problems occur, but problems will occur when either the RPD 16 or the core 14 lose connection to the timing grandmaster 12. In that holdover period where one or both devices have no connection to the timing clock of the grandmaster 12, the unconnected devices will drift in frequency and phase from the timing grandmaster 12 and from the other device. The magnitude of that drift will depend on many factors, including the length of the holdover period, temperature variations, internal oscillator performance etc. For example, an RPD with a typical TCXO oscillator might drift 1 ms in phase even within one hour. Typically, an RPD's drift is worse than the core's drift as the core usually has a better oscillator and is in a temperature-controlled environment.

When connection to the timing grandmaster 12 is restored, the RPD 16 (or core 14 if the core had lost connection) would measure its phase offset from the grandmaster 12 and would need to adopt one of two methods to correct the offset and re-establish synchronization in both phase and frequency. Ideally, because any phase step adjustment would cause connected cable modems to go offline, the RPD 16 or core 14 would only change its frequency relative to that of the grandmaster 12 to compensate for the phase offset, until such time as the phases are within tolerances, after which the frequency would be set to that of the grandmaster 12. However, to maintain DOCSIS compliance, frequency adjustments must be less than a specified threshold, so compensating for phase drift by frequency adjustments may often take a long time to achieve a desired phase adjustment, thus in many cases a phase step adjustment may simply be adopted which causes cable modems to go offline.

Moreover, when a reconnecting device attempts to resynchronize following holdover, that device only has knowledge of its offset from the grandmaster 12. The actual offset between the core 14 and the RPD 16, which is the important metric, is unknown. Because each device may drift in phase relative to the grandmaster in either direction, the offset between the two devices might be either much smaller or much larger than the offset from the core. Therefore, in many instances, using the offset from the grandmaster 12 to determine whether to perform a phase step adjustment or to adjust frequency over a long period of time provides inefficient results.

Figure 3:
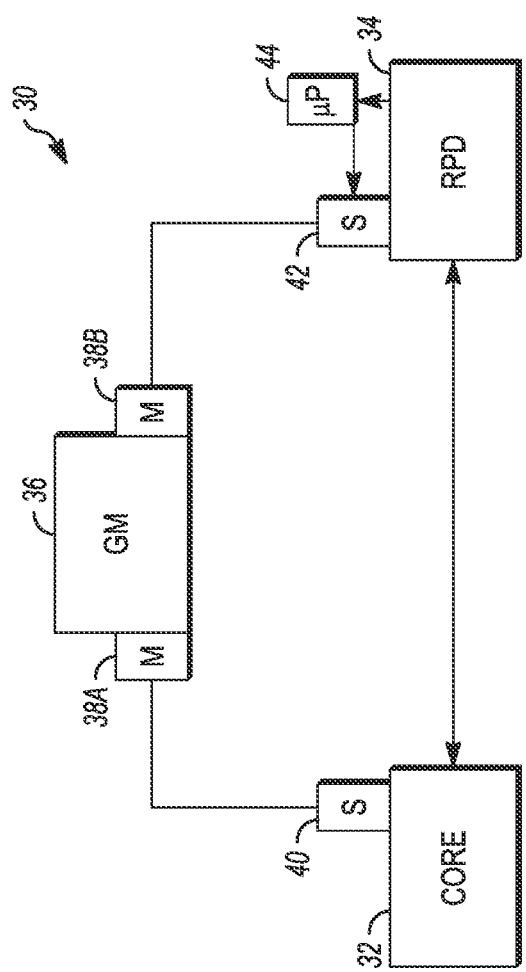
FIG. 3 shows a method used by the system of FIG. 2 that improves the performance of the system due to drift during holdover.

Referring to FIG. 3, an improved system 30 comprises a core 32, and RPD 34, and a timing grandmaster 36, which has two master timing ports 38a and 38b. Master timing port 38a is connected to slave timing port 40 in the core 32 and master timing port 38b is connected to slave timing port 42 in the RPD 34. FIG. 3 shows a dotted connection between the master timing port 38b and slave timing port 42 in the RPD 34 to illustrate that the connection may periodically be lost and regained, after which the RPD 34 will attempt to resynchronize with the grandmaster 36. In this instance, to select an appropriate resynchronization method, i.e. a phase step or alternately a frequency adjustment over an interval, the RPD 34 communicates with the core 32 to discover one or more parameters relevant to which resynchronization method is selected by the RPD 34. Relevant parameters may include one or more of the following non-exclusive metrics: the core's timing state, e.g. whether the core 32 is locked to the grandmaster 36; the core's measured offset from the grandmaster 32; the state of any cable modems connected to the RPD 34, e.g. whether any are already offline; and the currently configured MAP advance time.

The RPD 34 preferably includes a processor 44 that uses the information discovered from the core 32 to instruct the slave timer 42 on the method used to resynchronize its time to that of the grandmaster 36. In some embodiments, the core 32 may also temporarily change its MAP advance time to account for the additional phase offset to the RPD 34, until the RPD 34 regains synchronization with the grandmaster 36. Those of ordinary skill in the art will appreciate that variations on the system shown in FIG. 3 are readily achieved, including for example, repositioning the processor 44 to be located in the CCAP core 32 which may then send instructions directly to the slave timer 42 of the RPD 34. Alternatively, some embodiments may locate the processor 44 in a "cloud" server, where the processor 44 will receive information remotely from the RPD 34 and the core 32, and return recovery instructions. Those of ordinary skill in the art will also appreciate that, although FIG. 3 was used to illustrate a system that re-attains synchronization when an RPD loses connection to a timing grandmaster, similar systems may be used to re-attain synchronization when the core loses synchronization with a timing grandmaster.

Figure 4:
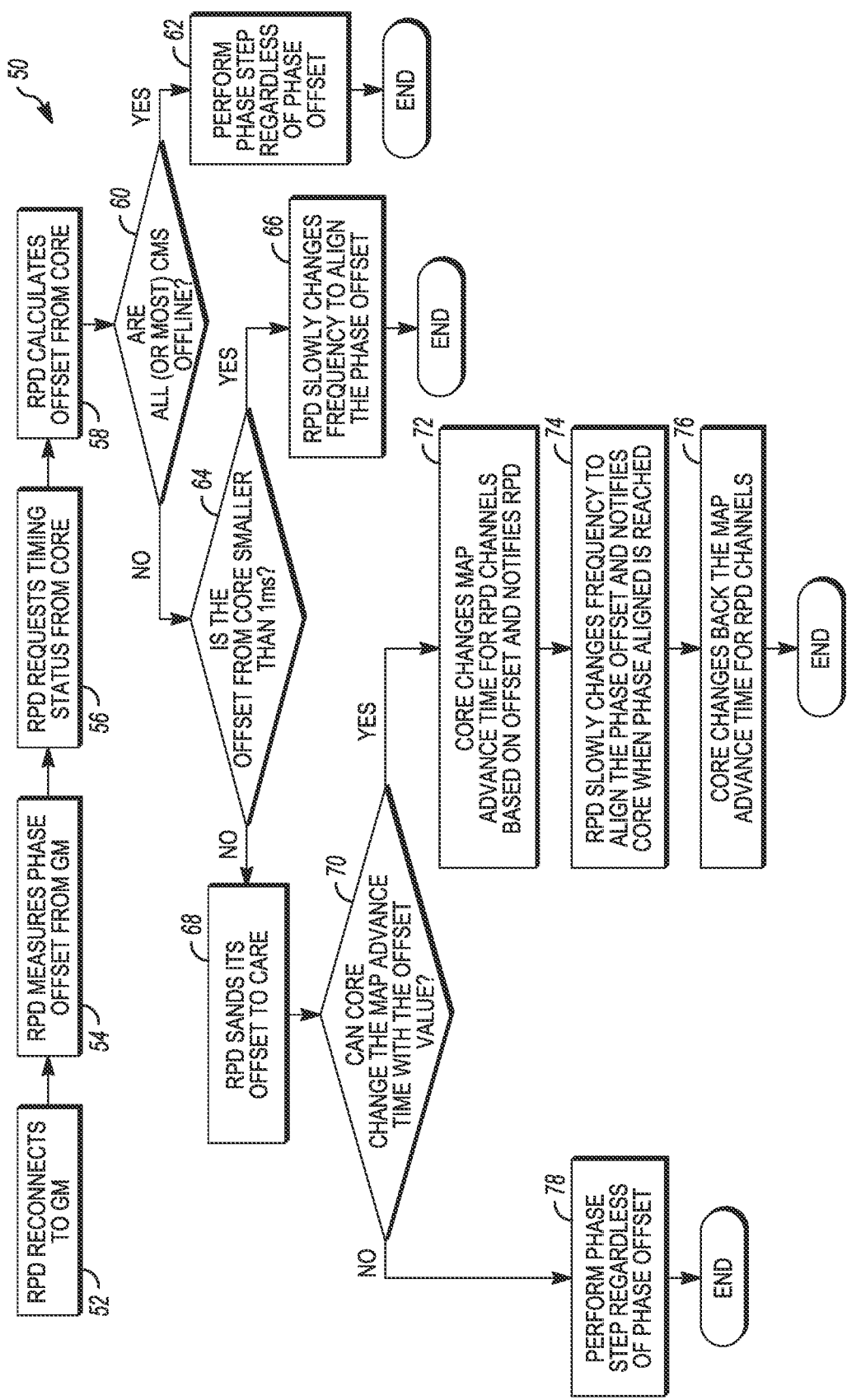
FIG. 4 shows an exemplary method used by the system of FIG. 3 to regain synchronization following drift.

FIG. 4 shows an exemplary method 50 used by the RPD 34 to regain synchronization with the grandmaster 36 following holdover. At step 52 the RPD 34 reconnects to the grandmaster timer 36. At step 54 the RPD 34 measures the phase offset from the grandmaster 36. At step 56 the RPD 34 requests timing status from the core 32. At step 58, the RPD 34 calculates the timing offset from the core 32.

At step 60, the RPD 34 determines whether a threshold number or percentage of cable modems attached to it are offline. In some embodiments, the threshold percentage may be between 10% and 50%, though other embodiments may use other thresholds. Moreover, in some preferred embodiments, the applied threshold is configurable so that the sensitivity of the system can be adjusted, as needed. If the answer at decision step 60 is yes, then at step 62 the RPD 34 simply performs a phase step to re-attain synchronization with the grandmaster 36 and the process ends. If the answer at decision step 60 is no, then the procedure proceeds to decision step 64, where the RPD 34 determines whether the offset from the core is smaller than a threshold value. In a preferred embodiment, the threshold is 1 ms, though in other embodiments other thresholds may be adopted.

If the answer at decision step 64 is yes, then at step 66 the RPD 34 slowly changes frequency until the phase difference with the grandmaster 36 is within tolerances and the procedure ends. If the answer is no, then at step 68 the RPD 34 communicates its offset to the core 32 and at step 70 the core 32 determines whether it can change the MAP advance time given the received offset. Factors that can be used by the core 32 to determine whether to change the MAP advance time may include any one or more of the following factors: (i) the current MAP advance time; (ii) the needed change in MAP advance time based on the phase offset from the RPD; (iii) anticipated bandwidth degradation if the MAP advance time is changed; and (iv) internal limitations on the maximum MAP advance time. If the core 32 determines not to change the MAP advance time, the RPD 34 performs at step 78 a phase step to re-attain synchronization with the grandmaster 36 and the process ends. If the core 32 determines to change the MAP advance time, then at step 72 the core 32 changes the MAP advance time for RPD channels based on the received offset and notifies the RPD that the MAP advance time has been changed. Then at step 74 the RPD 34 slowly changes frequency until the phase difference with the grandmaster 36 is within tolerances and the procedure ends. Again, those of ordinary skill in the art will also appreciate that, although FIG. 3 was used to illustrate a system that re-attains synchronization when an RPD loses connection to a timing grandmaster, similar systems may be used to re-attain synchronization when the core loses synchronization with a timing grandmaster.

Figure 5:
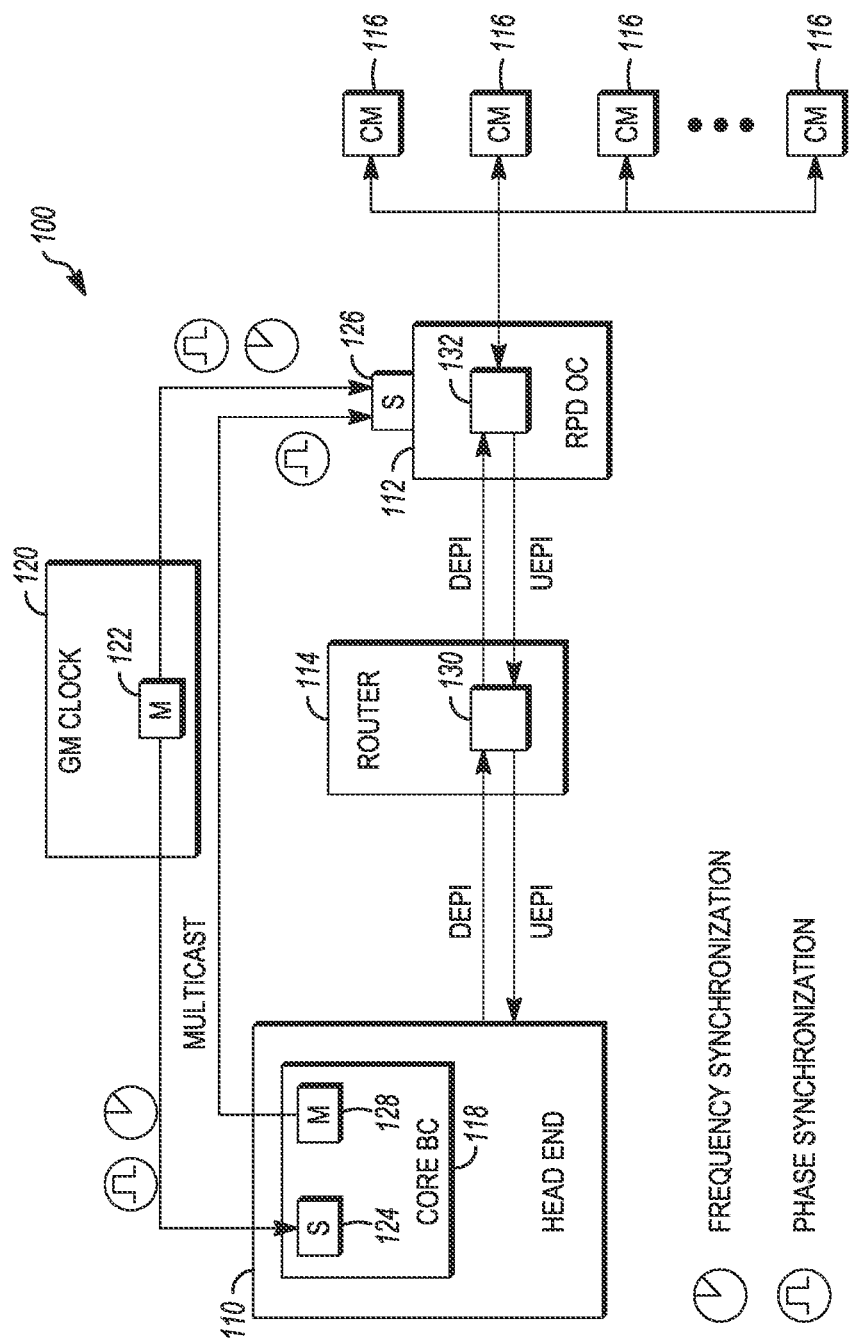
FIG. 5 shows an exemplary architecture for maintaining synchronization between a core and an RPD when the RPD loses connection to a master timer.

FIG. 5 shows an alternate R-PHY architecture 100 that improves holdover timing performance between a core and an RPY when the RPY loses connection to a timing grandmaster. Specifically, R-PPY architecture 100 comprises a head end 110 connected to an RPD 112 through a router 114 having a switch 130. The RPD 112 is in turn connected to a plurality of cable modems 116 via a splitter/amplifier network 132. The head end 110 and the RPD 112 are therefore able to communicate downstream signals using a Downstream External PHY Interface (DEPI) and upstream signals using an Upstream External PHY Interface (UEPI). Those of ordinary skill in the art will appreciate that the router 114 may be connected to a plurality of RPDs, each RPD in turn connected to its own set of cable modems, and the head end 110 may likely service an even larger set of RPDs through a network of routers 114.

As noted earlier in this disclosure, to effectuate the delivery of content between the head end 110 and the RPD 112, the head end 112 includes a core 118 that is synchronized in frequency and phase to the RPD 112 using a grandmaster clock 120. Specifically, the grandmaster clock 120 includes a master clock 122 used to synchronize a slave clock 124 in the core 118 and a slave clock 126 in the RPD 112, in both frequency and phase. As also noted earlier, the RPD 112 may lose connection to the grandmaster clock 120, in which case the RPD would ordinarily begin to drift relative to the grandmaster clock 120 and the core 118 in both frequency and phase. However, the system 100 also includes a core 118 that may in some embodiments act as a boundary clock by having a master clock 128 capable of transmitting a multicast stream containing timing information available to its downstream RPDs; when the RPD 112 loses connection to the grandmaster clock 120 the RPD 112 can join the multicast stream from the core 118 by which the master clock 128 sends synchronization information to the slave clock 126 in the RPD 112. In some embodiments, the master clock 128 constantly broadcasts the multicast stream, with its timing information, so that it can be joined by any downstream RPD 112 that loses connection to the grandmaster clock 120. In other embodiments, the master clock 128 may begin a multicast when a downstream RPD 112 loses connection to the grandmaster clock 120 and requests supplementary timing information from the core 118, after which other RPD's 112 may join into the multicast as needed, also sending a message to the core 118 indicating that the respective RPD has lost connection to the timing grandmaster and is using the multicast stream. Once an RPD 112 regains connection to the grandmaster clock 120, it may send a message to the core 118 indicating that it regained connection to the grandmaster clock 120. In such an embodiment, the master clock 128 will continue the multicast stream until every RPD 112 that had messaged the core 118 that it had lost connection to the grandmaster clock 120 has also messaged the core 118 that it regained that connection.

In some embodiments, the master clock 128 (which is synchronized to the grandmaster clock 120) may be used to maintain synchronization with the RPD 112 in both frequency and in phase using internal DOCSIS time information. However, in a preferred embodiment, the master clock 128 only sends frequency information to the slave clock 126 using IEEE 1588 Precision Time Protocol (PTP) announce and sync messages via multicast to the RPD 112 in a one-way communication with no need for any request/response interaction. In such an embodiment, the core 118 would not be loaded or burdened by maintaining synchronization in both frequency and phase; since the core 118 is still locked to the grandmaster timer 120 and typically will also have a high-quality oscillator which operates in a temperature-controlled environment, using the core 118 as a boundary clock for frequency information only during holdover could likely maintain a sufficient synchronization with an RPD 112 for days. A further advantage of using IEEE 1588 packets from the master clock 128 and not using internal DOCSIS time information is that common slave implementations utilize Assisted Partial Time Support (APTS) which is a method of maintaining holdover with frequency assistance from the network.

In an alternative embodiment, rather than transmit a multicast stream containing IEEE 1588 PTP announce-and-sync messages, the core 118 may instead transmit frequency information to its downstream RPDs 112 via DOCSIS sync messages (timestamps) using the DEPI link between the head end 110 and the RPD 112. Although in R-DEPI the core is not required to include a valid timestamp in sync messages, as the RPD 112 will either re-stamp them in D-MPT mode or not include them at all in PSP mode, in this alternative embodiment the core 118 will transmit the timestamps in either mode at a rate of at least 100 per second, or one every 10 ms. Thus, just as in the earlier embodiment where a multicast stream from the core 118 was used to send sync information to an RPD in holdover, in this embodiment when an RPD 118 loses connection to the grandmaster timer it may still access the timestamp information from the core 118 to maintain a frequency lock with the core 118 during holdover.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A system comprising:
 a Cable Modem Termination System (CMTS) core having a first slave clock configured to be synchronized with a grandmaster timer;
 a Remote Physical Device (RPD) having a second slave clock configured to be synchronized with the grandmaster timer; where
 at least one of the core and the RPD is configured to regain phase synchronization with the grandmaster timer, after losing synchronization with the grandmaster timer, by automatically and selectively implementing a phase step relative to the grandmaster, selection based on timing data exchanged between the core and the RPD.

2. The system of claim 1 where the RPD is configured to regain synchronization with the grandmaster timer, after losing synchronization with the grandmaster timer, based on timing data exchanged between the core and the RPD.

3. The system of claim 1 where the RPD is configured to regain synchronization with the grandmaster timer, after losing synchronization with the grandmaster timer, based on timing data exchanged between the core and the RPD.

4. The system of claim 1 where synchronization is regained with the grandmaster timer by a gradual change in a frequency difference relative to the grandmaster timer over a period of time when the phase step is not selected.

5. The system of claim 4 where selection is based on at least one of: (a) the core's measured offset from the grandmaster; (b) the RPD's measured offset from the grandmaster; (c) a respective state of at least one cable modem connected to the RPD; and (d), a the currently configured MAP advance time from the core to the RPD.

6. The system of claim 1 where the core changes its MAP advance time to the RPD based on a message from the RPD.

7. The system of claim 1 in an R-PHY architecture.

8. A method used in an R-PHY architecture to recover synchronization between a Cable Modem Termination System (CMTS) core and a Remote Physical Device (RPD), where both the core and the RPD are configured for individual synchronization in a slave configuration to a common grandmaster clock, the method comprising:
 a first one of the core and the RPD renewing synchronization with the grandmaster clock;
 exchanging at least one timing parameter between the core and the RPD; and
 the first one of the core and the RPD using the at least one timing parameter to regain synchronization with the grandmaster clock to automatically select an alternative one of a first change in synchronization relative to the grandmaster timer over a period of time and a second change in synchronization relative to the grandmaster timer over a period of time.

9. The method of claim 8 where the RPD regains synchronization with the grandmaster clock.

10. The method of claim 8 where the core regains synchronization with the grandmaster clock.

11. The method of claim 8 where the at least one timing parameter includes at least one of: (a) the core's measured offset from the grandmaster; (b) the RPD's measured offset from the grandmaster; (c) a respective state of at least one cable modem connected to the RPD; and (d), a the currently configured MAP advance time from the core to the RPD.

12. The method of claim 8 including the steps of: (a) receiving status information of a plurality of cable modems attached to the RPD; (b) comparing a threshold to the status information; and (c) selectively performing a phase step adjustment based on the comparison.

13. The method of claim 8 including the steps of: comparing a phase offset relative to the grandmaster clock to a threshold; and (b) selectively performing a gradual change in a frequency difference relative to the grandmaster timer over a period of time.

14. The method of claim 8 including the steps of: (a) receiving a phase offset value relative to the grandmaster timer; and (b) determining whether the core can change a MAP advance time based on the phase offset.

15. The method of claim 14 including the steps of: changing the MAP advance time; and selectively performing a gradual change in a frequency difference relative to the grandmaster timer over a period of time.

\* \* \* \* \*